March 24, 1931.  W. G. WHEELER  1,797,627
HEATER
Filed July 30, 1929
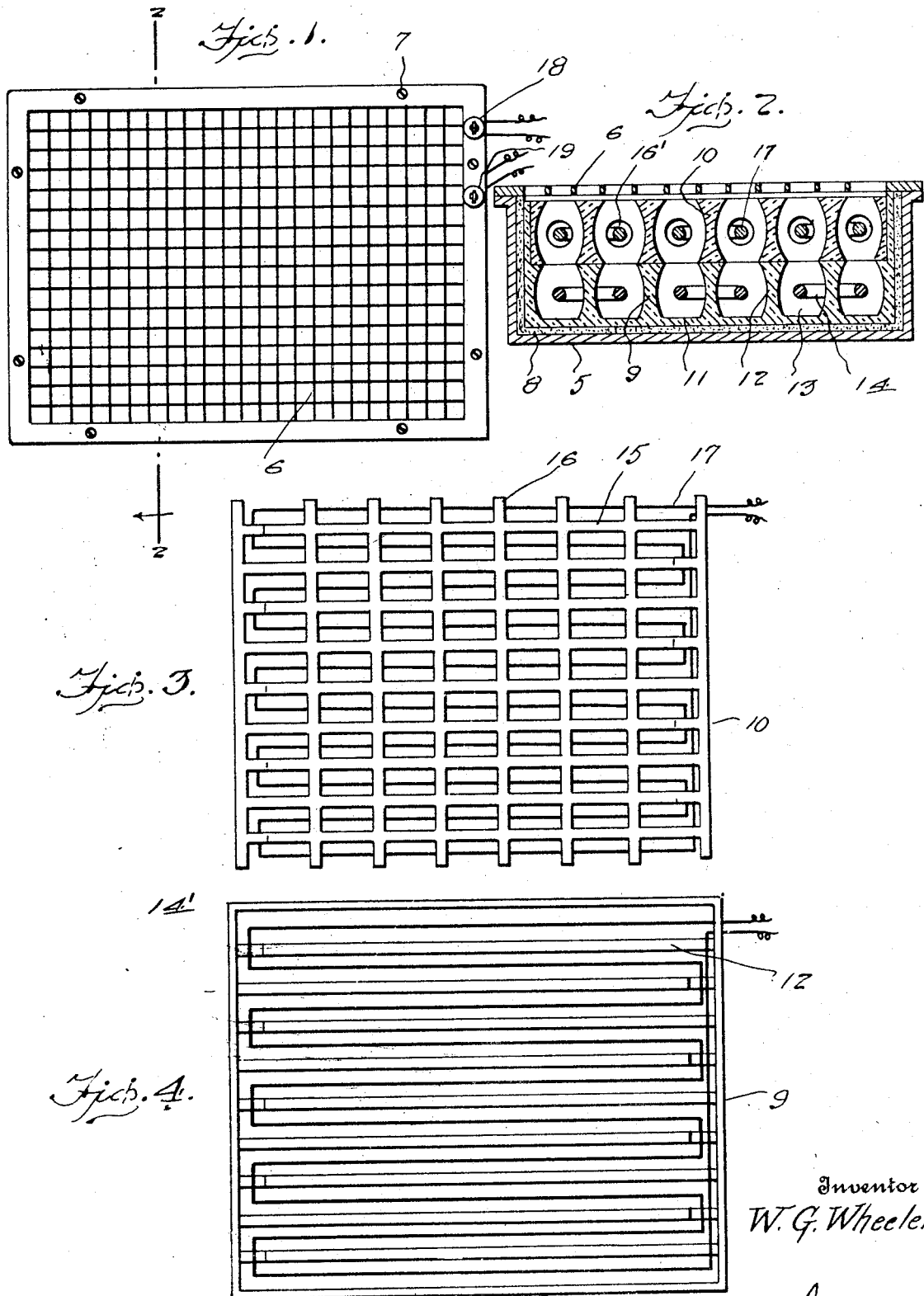
Inventor
W. G. Wheeler
By W. G. Beck Jr.
Attorney Patented Mar. 24, 1931

1,797,627

UNITED STATES PATENT OFFICE

WILLIAM GARFIELD WHEELER, OF MARION, OHIO

HEATER

Application filed July 30, 1929. Serial No. 382,150.

The present invention relates to heating devices and has particular reference to a device of this character adapted for use in heating passenger vehicles, such as automobile busses, railway trains, airship cabins and the like and embodies a plurality of electric heating elements suitably insulated and mounted within a casing recessed in the walls or floor of the passenger compartment of the vehicle and providing individual switches for selectively energizing the several heating elements.

One of the important objects of the present invention is to provide a heating device of this character in which the heating elements are carried by insulation plates to form individual heating units capable of being separately mounted in and removable from the casing so that the same may be readily replaced when desired.

Another object is to provide a device of this character of a simple and practical construction, which is compact in its arrangement, relatively inexpensive to manufacture and install in operative position and otherwise well adapted for the purposes for which the same is intended.

Other objects and advantages reside in the special construction, combination and arrangement of the various elements forming the invention, as more fully hereinafter described and claimed, reference being had to the accompanying drawings forming part hereof, wherein like numerals refer to like parts throughout the specification, and in which—

Figure 1 is a plan view showing the heater in assembled position,

Figure 2 is a sectional view taken along a line 2—2 of Figure 1, and

Figures 3 and 4 are plan views of the individual insulation plates.

Referring now to the drawing in detail, for the purpose of illustration I have disclosed a preferred embodiment of the invention which comprises a metal casing 5 open at its top and provided with a grill 6 at its open side to form a reticulated cover for the casing. The edges of the cover are secured to the casing by screws 7 or the like.

Within the casing is a lining of insulation material 8 extending over the bottom and side walls of the casing for separating a plurality of insulation plates designated at 9 and 10 respectively, from the walls of the casing.

The insulation plates are arranged in superposed relation within the casing, as clearly illustrated in Figure 2 of the drawings, the lower plate 9 being provided with a bottom section 11 with upstanding spaced parallel partitions 12 separating the plate into a series of channels 13. The wires 14 of an electric heating element are extended longitudinally within the channels in spaced relation from the sides of the partitions, the ends of the partitions being provided with openings 14' through which the wires are inserted for communication with the wire of the adjoining channel so that the wire 14 will form a continuous circuit throughout the plate.

The upper insulation plate 10 is of a reticulated formation, as clearly illustrated in Figure 3, being composed of intersecting partitions 15 and 16 extending respectively longitudinally and transversely of the plate and with each of the transverse partitions having openings 16' formed therein through which the wire 17 of an individual heating element may be inserted. The ends of the longitudinal partitions are also formed with openings (not shown) so that the wire of the heating element may be inserted therethrough for extending throughout the area of the plate. It will be understood from this construction that the heat from the lower heating element 14 may pass upwardly through the open reticulated plate 10 for discharge through the cover 6 together with the heat generated by the upper heating element.

The circuit wires of each of the heating elements extend through the walls of the plates for connection with a suitable source of electric current and have individual switches 18 and 19 respectively, interposed therein and mounted on the side edges of the cover 6.

In this manner the heating elements may be selectively controlled for separate or collective use.

It is obvious that the invention is susceptible of various changes and modifications without departing from the spirit thereof or the scope of the appended claims, and I accordingly claim as my own all such forms of the invention to which I am entitled.

I claim:

1. An electric heater comprising a casing having a reticulated cover, an insulating lining within the casing, a plurality of insulation plates mounted in the casing in superposed relation, the lowermost of said plates having a bottom section and spaced upstanding partitions and the uppermost plate being of a reticulated construction and individual heating elements carried by each of said plates.

2. An electric heater comprising a casing having a reticulated cover, an insulating lining within the casing, a plurality of insulation plates mounted in the casing in superposed relation, the lowermost of said plates having a bottom section and spaced upstanding partitions and the uppermost plate being of a reticulated construction and including intersecting longitudinal and transverse spaced walls mounted upon the upper edges of the partitions of the lowermost plate and individual heating elements carried by each of said plates inserted through one set of walls and in spaced relation from the other set of walls of the respective plates.

In testimony whereof I affix my signature.

WILLIAM GARFIELD WHEELER.